United States Patent
Kostuk et al.

(10) Patent No.: US 9,715,214 B2
(45) Date of Patent: Jul. 25, 2017

(54) CONFOCAL RAINBOW VOLUME HOLOGRAPHIC IMAGING SYSTEM

(75) Inventors: Raymond K. Kostuk, Tucson, AZ (US); Jose M. Castro, Naperville, IL (US); Paul J. Gelsinger-Austin, Pine Hill, NJ (US); Johnathan W. Brownlee, Tucson, AZ (US)

(73) Assignee: The Arizona Board of Regents on Behalf of the University of Arizona, Tucson, AZ (US)

( * ) Notice: Subject to any disclaimer, the term of this patent is extended or adjusted under 35 U.S.C. 154(b) by 501 days.

(21) Appl. No.: 13/825,744

(22) PCT Filed: Sep. 23, 2011

(86) PCT No.: PCT/US2011/053109
§ 371 (c)(1),
(2), (4) Date: Jun. 7, 2013

(87) PCT Pub. No.: WO2012/040639
PCT Pub. Date: Mar. 29, 2012

(65) Prior Publication Data
US 2013/0258429 A1    Oct. 3, 2013

Related U.S. Application Data

(60) Provisional application No. 61/404,024, filed on Sep. 24, 2010, provisional application No. 61/461,018, filed on Jan. 12, 2011.

(51) Int. Cl.
*G02B 5/00* (2006.01)
*G03H 1/08* (2006.01)
(Continued)

(52) U.S. Cl.
CPC .......... *G03H 1/0808* (2013.01); *G02B 5/32* (2013.01); *G02B 21/0064* (2013.01); *G03H 1/26* (2013.01); *G02B 27/46* (2013.01); *G03H 1/0248* (2013.01)

(58) Field of Classification Search
CPC .. G03H 1/00; G03H 1/04; G03H 1/26; G03H 1/2645; G03H 1/265; G03H 1/28
See application file for complete search history.

(56) References Cited

U.S. PATENT DOCUMENTS 5,743,846 A    4/1998 Takahashi
6,801,347 B2   10/2004 Nakamura
(Continued)

FOREIGN PATENT DOCUMENTS

WO    2011/044460 A1    4/2011

OTHER PUBLICATIONS

Paul J. Geisinger-Austin et. al. ("optical design for a spatial-spectral volume holographic imaging system", Optical engineering 49(4), 043001 (Apr. 2010)).*

(Continued)

*Primary Examiner* — Ricky Mack
*Assistant Examiner* — Robert E Tallman
(74) *Attorney, Agent, or Firm* — Barry L. Davison; Davis Wright Tremaine LLP

(57) ABSTRACT

A confocal rainbow holographic imaging system and hologram fabrication method. The system employs a multi-spectral light source, a multiple grating volume hologram and a dual pass illumination and imaging pathway which provide for depth sectioning of an object, coverage of the full FOV of the system, and high lateral and depth resolution. Dual matched holograms are used to provide a high image contrast ratio. A method for fabricating the holograms employ a novel combination of design tools is also provided.

21 Claims, 6 Drawing Sheets

(51) Int. Cl.
*G02B 5/32* (2006.01)
*G02B 21/00* (2006.01)
*G03H 1/26* (2006.01)
*G02B 27/46* (2006.01)
*G03H 1/02* (2006.01)

(56) References Cited

U.S. PATENT DOCUMENTS

| | | | |
|---|---|---|---|
| 7,158,228 B2 | 1/2007 | Psaltis | |
| 7,262,889 B2* | 8/2007 | Sun et al. | 359/15 |
| 9,295,375 B2 | 3/2016 | Shahinian | |
| 2005/0270609 A1* | 12/2005 | Chuang et al. | 359/22 |
| 2007/0241266 A1* | 10/2007 | Gweon | G02B 21/0032 250/225 |
| 2008/0123069 A1 | 5/2008 | Wabra | |
| 2009/0270683 A1 | 10/2009 | Farr | |
| 2010/0296178 A1 | 11/2010 | Genet | |
| 2013/0258429 A1 | 10/2013 | Kostuk | |
| 2013/0271803 A1 | 10/2013 | Yao | |
| 2016/0025970 A1 | 1/2016 | Fukuyama | |

OTHER PUBLICATIONS

Aiello, L., et al., "Green's Formulation for Robust Phase Unwrapping in Digital Holography," Optics and Lasers in Engineering 45(6):750-755, Jun. 2007.

Castro, J.M., et al., "Analysis of Diffracted Image Patterns From Volume Holographic Imaging Systems and Applications to Image Processing," Applied Optics 50(2):170-176, Jan. 10, 2011.

Castro, J.M., et al., "Confocal-Rainbow Volume Holographic Imaging System," Applied Optics, 50(10):1382-1388, Apr. 1, 2011.

Castro, J.M., et al., "Spatial-Spectral Volume Holographic Systems: Resolution Dependence on Effective Thickness," Applied Optics 50(7):1038-1046, Mar. 1, 2011.

Gelsinger-Austin, P.J., et al., "Optical Design for a Spatial-Spectral Volume Holographic Imaging System," Optical Engineering 43(4):043001-1-43001-5, Apr. 2010.

Li, Z., et al., "Volume Holographic Spectral Imaging," Proceedings of the SPIE 5694, Spectral Imaging: Instrumentation, Applications, and Analysis III, Mar. 31, 2005, pp. 33-40.

Liu, W., et al. "Real-Time Spectral Imaging in Three Spatial Dimensions," Optics Letters 27(10):854-856, May 15, 2002.

Luo, Y., et al., "Optimization of Multiplexed Holographic Gratings in PQ-PMMA for Spectral-Spatial Filters," Optics Letters 33(6):566-568, Mar. 15, 2008.

Luo, Y., et al., "Simulation and Experiments of Aperiodic and Multiplexed Gratings in Volume Holographic Imaging Systems," Optical Express 18(18):19273-19285, Aug. 30, 2010.

Oh, et al., "Theoretical Analysis of Curved Bragg Diffraction Images From Plane Reference Volume Holograms," Applied Optics 48(31):5984-5996, Nov. 1, 2009.

Sinha, A., and B. Barbastathis, "Broadband Volume Holographic Imaging," Applied Optics 43(27):5215-5221, Sep. 20, 2004.

Sinha, A., et al., "Volume Holographic Imaging in the Transmission Geometry," Applied Optics 43(7):1553-1551, Mar. 1, 2004.

Sun, W. and G. Barbastathis, "Rainbow Volume Holographic Imaging," Optics Letters 30(9):976-978, May 1, 2005.

International Search Report mailed Feb. 27, 2013, in International Patent Application No. PCT/US2012/061196, filed Oct. 19, 2012, 3 pages.

International Search Report mailed May 1, 2012, in International Patent Application No. PCT/US2011/053109, filed Mar. 29, 2012, 3 pages.

* cited by examiner

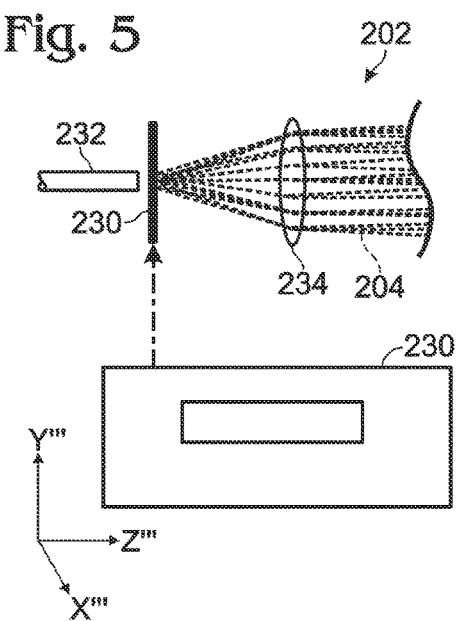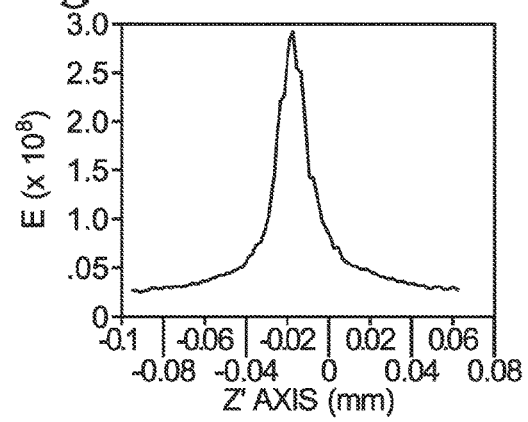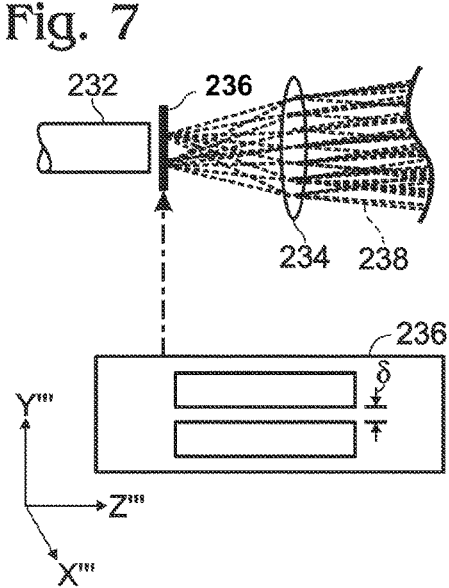

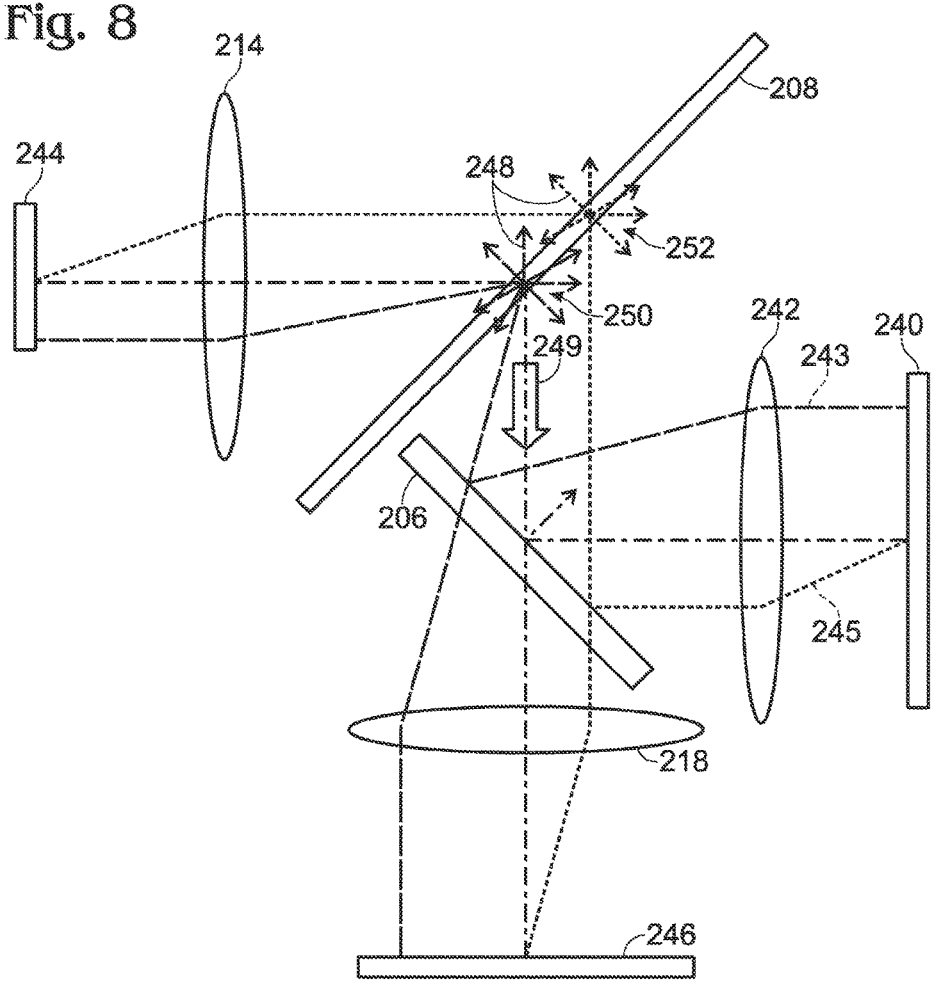

CONFOCAL RAINBOW VOLUME HOLOGRAPHIC IMAGING SYSTEM

RELATED APPLICATIONS

This patent application claims the benefit of U.S. provisional patent application No. 61/404,024, filed on Sep. 24, 2010, and to U.S. provisional application No. 61/461,018, filed Jan. 12, 2011, both of which are hereby incorporated by reference in their entirety.

TECHNICAL FIELD

The present invention relates to holographic imaging systems, and more specifically, to volume holographic imaging systems wherein an object to be imaged is illuminated by multi-spectral light in such a way as to increase resolution, eliminate the need for mechanical scanning and increase the signal-to-noise ratio of the resultant image.

BACKGROUND

High resolution three-dimensional (3D) optical imaging instruments, such as confocal microscopes and optical coherence tomography systems, are important tools in biological and medical research. During the last decade, volume holographic imaging systems (VHISs) have been developed which use the wavefront selection properties of a volume hologram to select multiple images from respective multiple object depths. See W. Liu et al. "Real-time spectral imaging in three spatial dimensions," Opt. Lett. 27, 854-56 (2002); A. Sinha et al., "Volume holographic imaging in the transmission geometry," Appl. Opt. 43, 1533-51 (2004) (herein "Sinha I"); Z. Li et al., "Volume holographic spectral imaging," Proc. SPIE 5694, 33-40 (2005); A. Sinha et al., "Broadband volume holographic imaging," Appl. Opt. 43, 5215-5221 (2004) (herein "Sinha II"); Y. Luo, "Optimization of multiplexed holographic gratings in PQ-PMMA for spectral-spatial filters," Opt. Lett. 33, 566-68 (2008) (herein "Luo I"); P. J. Gelsinger-Austin et al., "Optical design for a spatial-spectral volume holographic imaging system," Opt. Eng. 49, 043001 (2010); Y. Luo, "Simulation and experiments of aperiodic and multiplexed gratings in volume holographic imaging systems," Opt. Express 18, 19273-19285 (2010) (herein "Luo II"); W. Sun et al., "Rainbow volume holographic imaging," Opt. Lett. 30, 977-978 (2005); and, Psaltis et al., U.S. Pat. No. 7,158,228, all of which are hereby incorporated by reference in their entirety. Such VHISs have achieved lateral and depth resolution of ~3 µm and ~12 µm, respectively, when using monochromatic illumination and standard lens components. Liu et al., Sinha I, Sinha II, Luo I, Gelsinger-Austin et al., and Lou II, id. However, a disadvantage of using a monochromatic source is that lateral scanning is required in order to capture the complete image field.

Using a broadband source has been proposed and implemented with the goal of avoiding mechanical scanning while maintaining the resolution achieved using mono-chromatic sources. However, in practice it has been observed that the utilization of a broadband illuminator dramatically reduces the depth sectioning capabilities of VHIS. Sinha II, Luo I, Gelsinger-Austin, Luo II and Sun et al., Id.

An approach to improve depth resolution that utilizes a rainbow illumination pattern produced by the diffraction of a broadband source on an external grating has been proposed. Sun et al., id., and Sun et al. U.S. Pat. No. 7,262,889 (the Sun '889 Patent) which is hereby incorporated by reference in its entirety. This type of VHIS configuration has been shown capable of improving the depth resolution to values >200 µm. There are limitations for improving depth resolution beyond that value using this configuration, because it requires accurately matching the wavefront of the external diffraction gratings (illumination hologram) and internal diffraction gratings (imaging hologram) and because there must inevitably be a finite angle between the optical axis of the illumination hologram and the optical axis of the imaging hologram.

The basic configuration of a VHIS 10 is illustrated in FIG. 1. The system (having coordinates x, y, z) consists of an objective lens 12, a volume hologram 14 placed in the Fourier plane of the objective lens 12, and a collection lens 16. The objective lens 12 receives light from an object 18 disposed in object space (denoted by coordinates x', y', z'), and the collection lens 16 forms a real image 20 of the object in image space (denoted by coordinates x", y", z"). The hologram 14 comprises a thick hologram having angle-multiplexed planar and spherical wave gratings having high angular and spectral selectivity. A broadband source is used to illuminate the object. A system of this type is disclosed in the Sun '889 Patent.

Because of the high selectivity, each grating, if illuminated with a monochromatic point source, would select a specific wavefront that originates at a corresponding depth from within object space. Multiplexing several gratings into the same volume allows mapping points from multiple depths in object space to distinct, corresponding locations on the image plane (x", y") in image space as shown by respective marginal rays 17 and 19. For each plane in object space the mapping is determined by two properties of the volume hologram 14: (1) its spatial degeneracy; and (2) its angular dispersion. Because of the first property, the wavefront of a point source at any position along the y' axis satisfies the Bragg phase-matching condition of the hologram 14 and therefore is diffracted to the collection lens 16. This diffraction is responsible for the y axis field of view (FOV) of the system The FOV along the spatial degeneracy axis y axis does not follow a straight line along the y' axis, as represented by the cylinder axis shown in FIG. 1. Rather, it follows hyperbolic curves such as $\delta\lambda_0$, $\delta\lambda_1$, $\delta\lambda_2$, $\delta\lambda_3$, $\delta\lambda_4$ and so forth, as illustrated in FIG. 3 and described in Castro et al., "Analysis of diffracted image patterns from volume holographic imaging systems and applications to image processing," Appl. Opt. 50, 170-176 (2011), hereby incorporated by reference in its entirety. The lateral resolution in the y axis depends mainly on the numerical aperture (NA) of the objective lens 12.

The angular dispersion of the hologram 14 and the spectral bandwidth of the readout source in image space, such as a CCD array, determine the FOV in the dispersive axis, that is, x axis. The lateral resolution along the x axis depends on the spectral selectivity of the hologram, which can be improved by optimizing its fabrication parameters. Luo I, Gelsinger-Austin et al., and Luo II, id., and Castro et al., "Resolution dependence on index modulation profile and effective thickness in volume holographic imaging systems," Appl. Opt. (1 Mar. 2011, Vol. 50, No. 7, pp. 1038-46), hereby incorporated by reference in its entirety. For a VHIS operating with monochromatic illumination, the depth selectivity depends on the NA of objective lens 12 and the angular bandwidth of the hologram 14.

VHIS prototypes using monochromatic sources have achieved lateral resolution of 2:5 µm and depth resolution of ~12 µm. Liu, id. However, a drawback is that in this configuration, scanning is required to capture the x axis FOV. However, when a broadband light source is utilized as an illuminator in the VHIS, the depth selectivity is essentially lost.

A VHIS 100 using multi-spectral, or "rainbow," illumination to improve the selectivity without requiring lateral scanning is illustrated in FIG. 2. This approach requires two sets of gratings and lenses: one to provide the rainbow illumination and the other for imaging. Thus, a beam of multi-spectral illumination 102 is applied to illumination hologram 104, which diffracts the multi-spectral light by different angles depending on the wavelength of the light, as shown at 106 by marginal rays 107 and 109. An illumination lens 108 then focuses light of different wavelengths to different locations in its image space. The image space of the illumination lens 108 is the object space 110 of an objective lens 112 that collects light from points in that object space, collimates it and illuminates an imaging hologram 114. The hologram 114 discrimination selects light from only one point in object space for a given wavelength as shown by marginal rays 111 and 113 and directs light 120 through a collection lens (not shown) to a corresponding unique point on a plane in image space.

The rainbow illumination is produced by the dispersive properties of the illumination hologram 104. Ideally, the illuminated plane 116 should overlap the object plane 118 along the complete FOV of both the illumination lens 108 and the objective lens 112. Also, the spectral dispersion produced by each set of optical elements should match. This ideal condition cannot be fully attained with the layout shown in FIG. 2. The challenge of dispersion-matching between gratings in the illumination hologram 104 and the gratings in the imaging hologram 114 limit the depth resolution not only in the optical axis but also over the complete FOV in the object plane. Even if that challenging condition could be satisfied, an overlap between the illuminated plane 116 and the object plane 118 is required. For imaging systems using an objective lens with NA>0:5, this latter condition is not attainable with external illumination and a thin grating with poor selectivity properties must be used. For example, FIG. 2 shows that there is a tilt angle, $\epsilon$, between the object plane and the illuminated plane. This angle, which takes values of ~60° for lenses with NA ¼ 0:5, reduces significantly the region in which the object and the illuminated plane overlap.

In view of the foregoing, there has been an unmet need for a VHIS which provides for depth sectioning of an object, eliminates the need for a mechanical scanning apparatus to cover the FOV of the system, provides high lateral and depth resolution, and provides for a high image contrast ratio.

SUMMARY

What is presented herein are novel holographic imaging systems and a method for making a volume hologram.

One such imaging system comprises a volume hologram having a front and a back and at least one diffraction grating formed therein; an objective lens having a front and a back and being disposed in front of the hologram so as to perform an optical transformation between a point on a surface in front of the objective lens corresponding to said diffraction grating and a beam propagating between the back of the objective lens and the front of the hologram; a collection lens having a front and a back and being disposed in back of the hologram so as to perform an optical transformation from beam propagating from the back of the hologram to the front of the collection lens and to a point in back of the collection lens; and a multi-spectral illuminator disposed with respect to the hologram so as to provide an illumination beam of light coupled to the back of the hologram to produce multiple diffracted beams of light at the front of the hologram corresponding wavelengths of light in the illumination beam which are focused by the objective lens to respective different positions on the surface in front of the objective lens corresponding to said diffraction grating. To achieve depth sectioning the hologram has multiple diffraction gratings formed therein so that light in the illumination beam originating from different lateral positions converges to respective points on a corresponding distinct parallel planes in front of the objective lens, and each image of point in front of the objective lens is formed at a unique location on the back focal plane of the collection lens.

Another such system comprises an objective lens system having a front, a back, a first optical axis, and a pupil disposed in back of the objective lens system; a collection relay lens system having a front and a back and sharing the first optical axis; a collection lens having a front and a back; an imaging volume hologram having one or more diffraction gratings formed therein disposed between the collection lens and the collection relay lens system at a point on the first optical axis conjugate to the location of the pupil of the objective lens system on the first optical axis and at the front focal point of the collection lens; an illumination relay lens system having a front and a back and a second optical axis intersecting the first optical axis at a nonzero angle; an illumination lens having a front and a back; an illumination volume hologram disposed between the illumination lens and the illumination relay lens system at a point on the second optical axis conjugate to the location of the pupil of the objective lens system on the first optical axis and at the back focal point of the illumination lens, the illumination volume hologram having diffraction gratings formed therein that are substantially identical to the diffraction gratings formed in the imaging hologram; and a beam splitter disposed at the intersection of the first optical axis and the second optical axis so as to reflect light from the illumination relay lens system toward the objective relay lens system and to pass light from the objective relay lens system to the collection relay lens system. When a source of multi-spectral light is disposed at the front focal point of the illumination lens and an object is placed in front of the objective lens, points on the object that are illuminated by light from the multi-spectral source will be imaged at the back focal plane of the collection lens, while most light that is diffusely scattered by the illumination hologram and the imaging hologram will be directed away from the back focal plane of the collection lens by the beam splitter.

A method for making a thick hologram for use in an imaging system, comprising configuring a first order confocal rainbow holographic imaging system; performing a ray trace analysis of the first order optical system to compute the required curvature of the grating vector across the aperture of the hologram; determining the diffraction efficiency and the diffracted ray direction at a plurality of locations on the hologram aperture using corresponding localized grating vectors, corresponding ray directions from the ray trace analysis, coupled wave analysis; and determining properties of the image created by the optical system based on the ray directions and diffraction efficiencies at the plurality of locations on the hologram aperture. The steps may be repeated with different hologram refractive index modulations and evaluating the acceptability of the image properties until acceptable image performance is achieved.

It is to be understood that this summary is provided as a means for generally determining what follows in the drawings and detailed description, and is not intended to limit the scope of the invention. Objects, features and advantages of the invention will be readily understood upon consideration of the following detailed description taken in conjunction with the accompanying drawings.

BRIEF DESCRIPTION OF THE DRAWINGS

FIG. 5 is an illustration of the structure and operation of a first embodiment of a multi-spectral illuminator for use in the system of FIG. 4.

FIG. 6 is a representative graph of energy propagated through the system of FIG. 4 as a function of position of the object surface along the optical axis of the system.

FIG. 7 is an illustration of the structure and operation of a second embodiment of a multi-spectral illuminator for use in the system of FIG. 4.

FIG. 8 is an illustration of a system of the type illustrated in FIG. 4 wherein light scattered by the hologram is illustrated.

DETAILED DESCRIPTION OF EMBODIMENTS OF THE INVENTION

Figure 1:
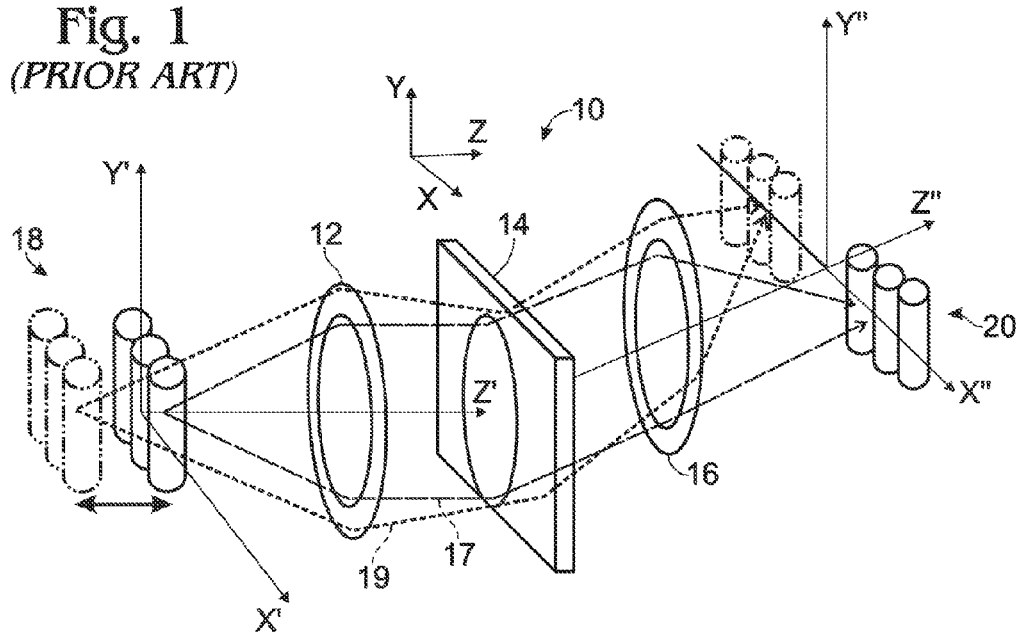
FIG. 1 is an illustration of the structure and operation of a first prior art volume holographic imaging system.

The present invention will be readily understood by the following detailed description in conjunction with the accompanying drawings. To facilitate this description, like reference numerals designate like structural elements. In the following description many details are set forth to provide an understanding of the disclosed embodiments of the invention. However, upon reviewing this disclosure, it will become apparent to one skilled in the art that not all of the disclosed details may be required to practice the claimed invention and that alternative embodiments might be constructed without departing from the principles of the invention.

To provide a VHIS which enables depth sectioning of an object, eliminates the need for a mechanical scanning apparatus to cover the FOV of the system and provides high lateral and depth resolution, a system is disclosed which uses the same light path to illuminate an object with multi-spectral light as to image the object. This approach is referred to herein as "confocal rainbow volume holographic imaging" (CF VHI) and such a system is referred to herein as a "confocal rainbow holographic imaging system" (CR VHIS). This approach overcomes the need to mechanically scan along the non-degenerate lateral axis in object space, the difficulty of matching dispersive characteristics of separate illumination and imaging holograms that have different optical axes, and the lack of FOV overlap produced by separate illumination and imaging holograms that have different optical axes.

Figure 4:
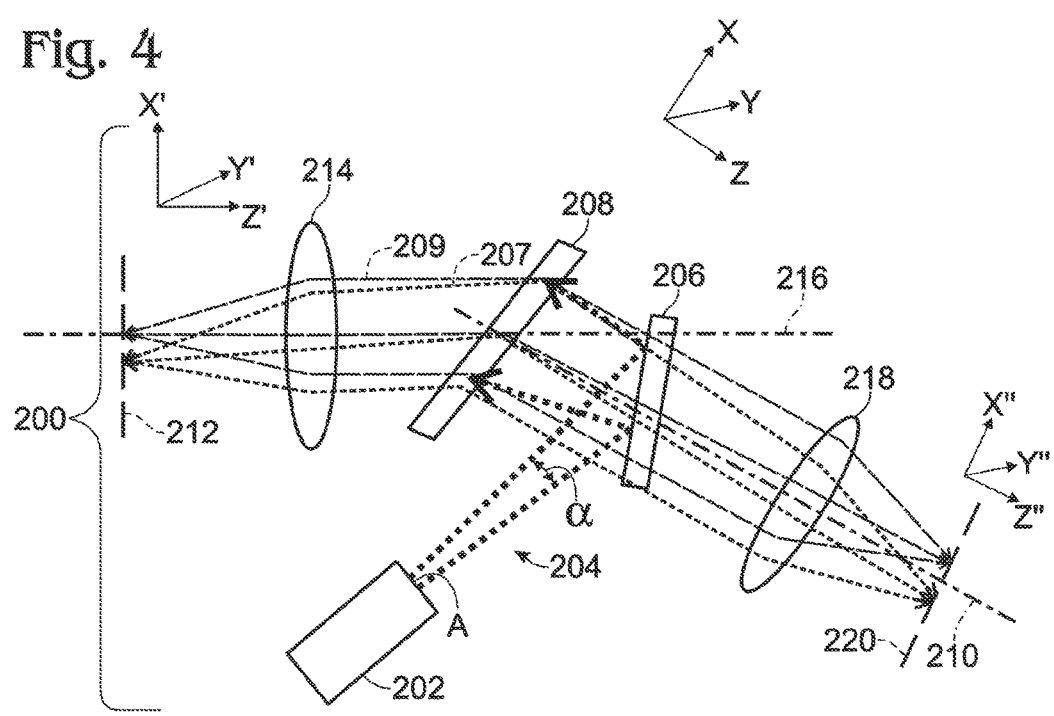
FIG. 4 is an illustration of the structure and operation of a first embodiment of a confocal-rainbow volume holographic imaging system according to the present invention.

A first embodiment 200 of a CR VHIS is shown in FIG. 4. In this embodiment a multi-spectral illuminator 202 produces a broad band illumination beam 204 of light with a non-symmetric limited angular spectrum as will be explained further hereafter. A beam splitter 206 reflects that illumination beam toward a volume hologram 208 that serves as both an illumination hologram and an imaging hologram. The hologram 208 is tilted at selected angles $X_\theta$ and $Y_\beta$ to the optical axis 210 in the system space (denoted by coordinates X, Y, Z) to maximize the FOV and minimize stray light reflections. Emitting area A and angle α of the light beam illuminator 202 are designed to fill both the aperture of the hologram 208 and its acceptance angle after being reflected by the beam splitter.

The hologram 208 disperses the multi-spectral light from beam 204 at different angles along the X' axis of the object space (denoted by X', Y', Z'), which angles are a function of the wavelength of the light, as shown by marginal rays 207 and 209. The light is focused to points on a plane 212 along the X' axis in object space by objective lens 214 having a common illumination and imaging optical axis 216. Light reflected from a point on an object along plane 212 in object space travels back through objective lens 214, where it is substantially collimated, and through the hologram 208 along the same path it followed to get to the object from the beam splitter 206. This reflected light passes through the beam splitter to collection lens 218, which focuses it to a spot on image plane 220. The spot to which the light is focused depends on several things: the wavelength λ of the light; the depth along Z' of the plane in object space; and the positions of the point along X' and Z' in object space.

Thus, in the CR VHIS 200 light passes through the hologram 206 and the objective lens 214 twice: once to produce the illumination and again to form the image. The double light pass through the objective lens and the hologram results in a spatial filtering effect comparable to that found in a slit confocal microscope. Light from the object corresponding to wavefronts not recorded in the hologram is rejected.

Turning now to FIG. 5, the illuminator 202 includes a mask 230 for placement behind a multi-spectral light source, such as fiber bundle 232 emitting multi-spectral light. When using a one-grating hologram the mask has only one aperture as indicated in FIG. 5. The mask has a rectangular aperture with asymmetrical shape to match the dispersive (X) axis and degenerate (Y) axis of the image formed by the hologram. The aperture is selected to limit the size of illumination to reduce reflective noise in the system. The mask 230 is followed by an output lens 234 that couples the output light 204 to the hologram 208 in FIG. 4 and matches the multi-spectral light source to the angular bandwidth and size of the hologram.

To achieve depth sectioning, a plurality of gratings must be present in the hologram 208 and the illuminator employs a mask having a corresponding plurality of apertures. As an example, referring to FIG. 7, for a two-grating multiplexed hologram, a mask 236 with two apertures is used to produce separate beams in the output light 238 that activate two respective gratings in the hologram. Assuming an angular separation δ between gratings, the separation h of the apertures is given by $h \propto f_1 \tan(\delta)$, where $f_1$ is the focal light of lens 234. For a hologram having more than two gratings, which is needed to section the object at more than two respective depths, each mask aperture must be separated from its nearest neighbors by δ.

Figure 2:
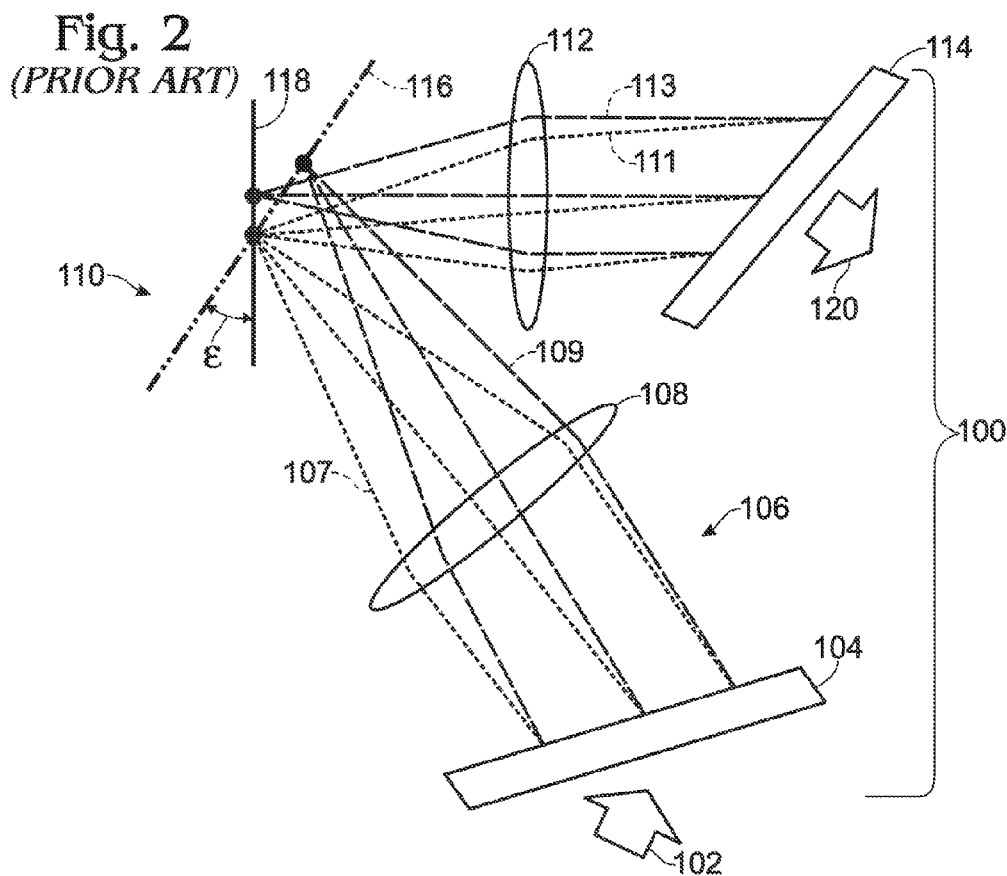
FIG. 2 is an illustration of the structure and operation of a second prior art volume holographic imaging system.
Figure 3:
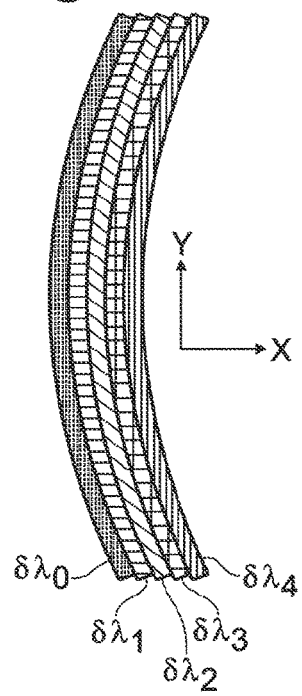
FIG. 3 is an illustration of a representative image of a band of multi-spectral illumination light produced on a focal plane of an objective lens in a volume holographic imaging system.

As in the case of the prior art VHIS shown in FIG. 2, the illumination light produces a rainbow pattern as shown in FIG. 3 on an object plane such as plane 212 in FIG. 4. In FIG. 3 the spread of each wavelength band of the source spectrum is represented as a slit. The width of each slit (color), $\delta\lambda_0$, $\delta\lambda_1$, $\delta\lambda_2$ and so forth, which is exaggerated in FIG. 3, depends on the angular bandwidth of the hologram 208 and, therefore, on the effective thickness and index modulation profile of the hologram. The diffractive pattern shape follows the function F(x', y', λ, K). This function represents a set of conic curves, where x' and y' denote the position in the object plane, λ is the wavelength illuminating this position, and K is the grating vector the corresponding grating vector of the hologram 208. The function F(x', y', λ, K) can be derived from the Bragg condition, as explained in Castro, et al., supra, and also from the Born approximation, as explained in Oh et al., "Theoretical analysis of curved Bragg diffraction images from plane reference volume holograms," Appl. Opt. 48, 5984-5996 (2009), hereby incorporated by reference in its entirety. In most cases the diffractive field forms hyperbolic patterns. For a hologram 208 with negligible angular bandwidth, there is only one curve for each λ. However, in practice, there is a finite width for each color, which is in general one of the main limiting factors in all VHIS configurations.

By using the double pass optics, greater depth resolution may be achieved. This is shown by experimental results shown in FIG. 6 wherein the energy E captured by in the image is plotted as a function of the Z' axis in object space.

A CR VHIS requires careful design to minimize undesired reflection noise from the beam splitter 206 and the hologram surface 208. To minimize the specular reflection of the source to the detector, the hologram must be tilted around the x axis (β>0) to redirect reflected light out of the imaging path. Although the precise value of this rotation depends on the layout of the system, simulation and experimental results suggest β~10° to reduce this reflection. In addition, the illumination aperture size, A, and emitting angles, d, must be designed to fill the aperture of the hologram, as well as the hologram angular acceptance range, in order to illuminate the entire field of view efficiently. Descriptions of simulated and actual experimental results for CR VHISs can be found in Castro et al., "Confocal-rainbow volume holographic imaging system," App. Opt., Vol. 50, No. 10/1 (April 2011), hereby incorporated by reference in its entirety.

A potential problem with any VHIS is that surface defects and bulk material imperfections in the volume hologram can produce unwanted random scattering that leads to low image contrast, that is, a low signal-to-noise ratio. This is illustrated in a CR VHIS by FIG. 8, where a simplified illuminator is represented by multi-spectral source 240 and lens 242, an object 244 is shown in object space, and an image detector 246, such as a CCD camera, is shown in image space. Light propagates through the system as shown by marginal ray 243 and principal ray 245. Light 248 that is randomly scattered by the hologram both when illumination light passes through it and when image light passes through it is illustrated at points 250 and 252. Much of that scattered light 249 finds its way to the image detector 246 because the illumination light and the imaging light share the same path.

Figure 9:
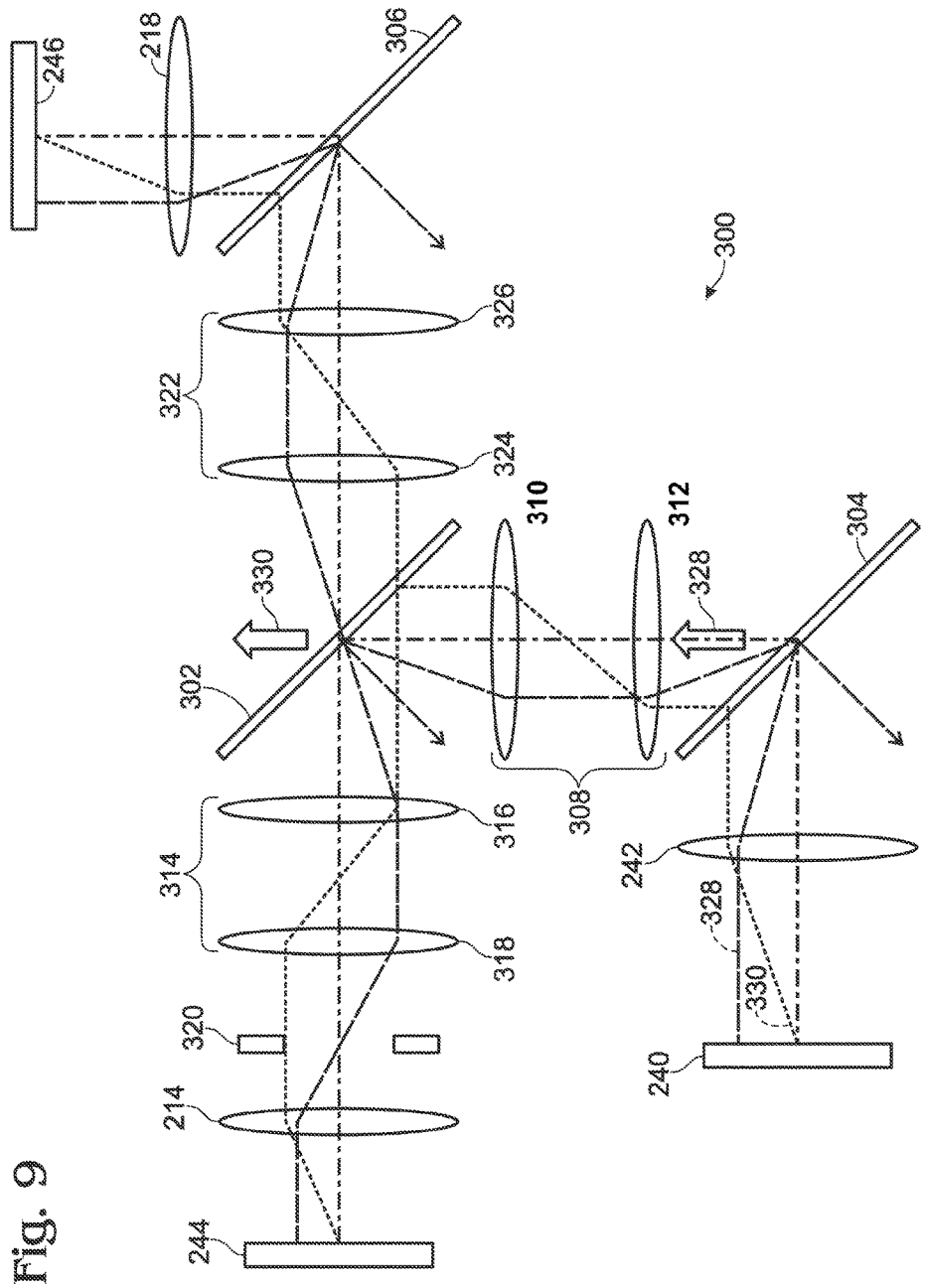
FIG. 9 is an illustration of a second embodiment of a confocal-rainbow volume holographic imaging system according to the present invention wherein two holograms are used to reduce scattering noise.

To reduce the amount of scattered light that makes it to the image detector, the imaging and illumination paths can be separated in a way that directs most of the scattered light away from the image detector, yet retains the advantages of a CR VHIS. A second embodiment 300 of the invention that produces this result is shown in FIG. 9. As in FIG. 8, an illuminator is represented by source 240 and lens 242, an object 244 is disposed in object space, and an image detector 246 is disposed in image space. However, in this case a beam splitter 302 is disposed between the object and two matched holograms 304 and 306. Hologram 304 is in the illumination path and hologram 306 is in the image path. Both holograms have identical construction to ensure that Bragg matching will occur across the entire FOV.

In this case a first relay 308 with unity magnification is disposed between the illumination hologram 304 and the beam splitter 302. The relay 308 comprises lens 310 and lens 312. A second relay 314, comprising lens 316 and lens 318, is disposed between the objective lens 214 and the beam splitter 302. Aperture stop 320 is disposed between objective lens 214 and relay 314 to establish the pupil of the objective lens system where the beam splitter is positioned. A third relay 322, comprising lens 324 and lens 326, is disposed between the beam splitter 302 and the imaging hologram 306. These relays enable the beam splitter to be placed at the pupil plane, which serves to create two distinct paths for illumination and imaging. Light propagates through the system as shown by marginal ray 328 and principal ray 330.

It can be seen that in this case, light 328 that is strongly scattered by the illumination hologram and light 330 that is strongly scattered by the imaging hologram is directed away from the imaging path.

Figure 10:
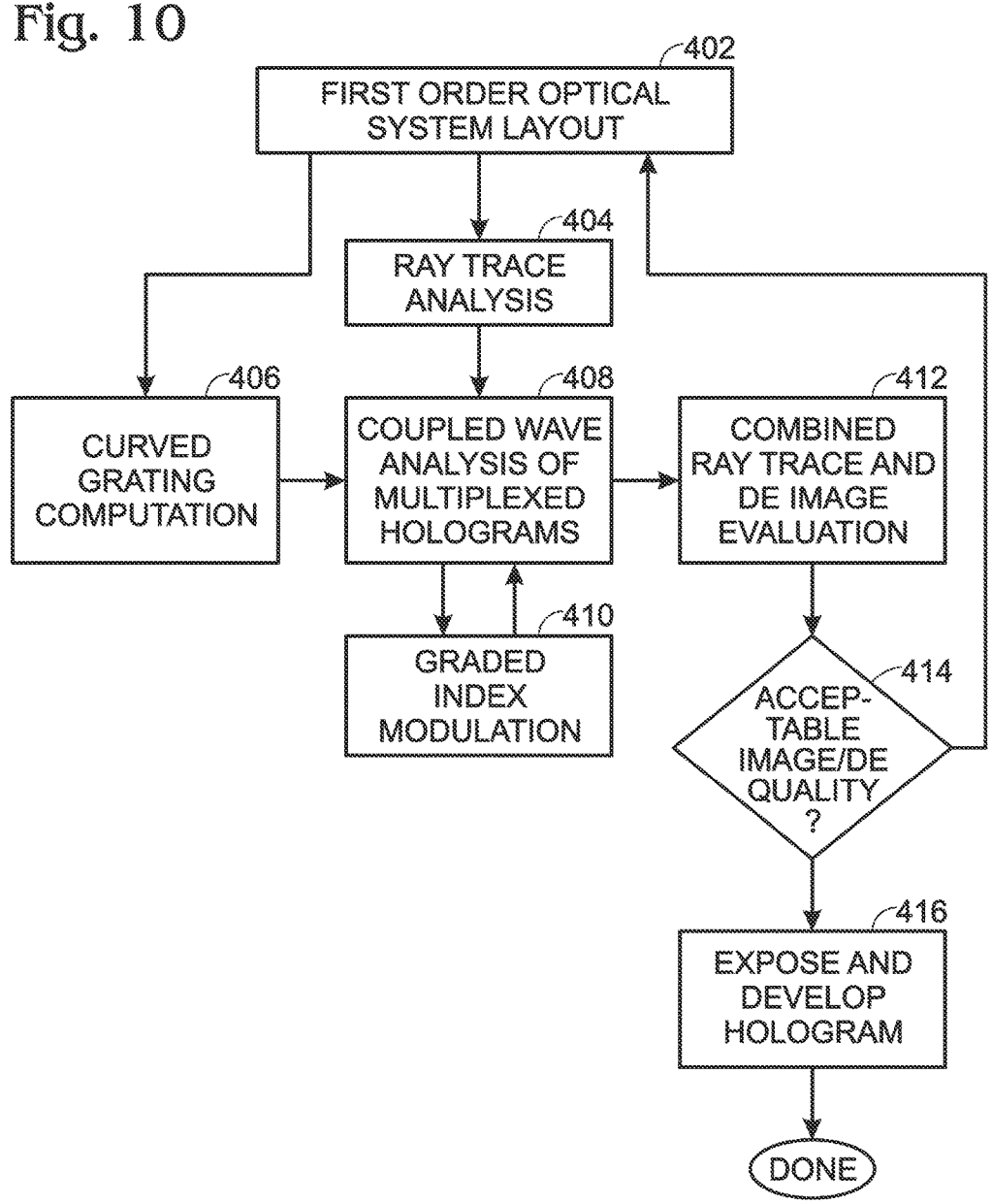
FIG. 10 is a flow chart representing the steps of a method for producing a volume hologram for use in a confocal rainbow volume holographic imaging system according to the present invention.

A method for producing a suitable hologram 208, 304 and 306 is illustrated in the flow chart in FIG. 10. Initially, at step 402, a first order optical design is configured to provide the basic layout of the imaging system. In step 404, the output from the first order design is used in a ray trace analysis of the system and, in parallel step 406, to compute the curvature of the grating vector across the aperture of the hologram. In step 408, localized grating vectors and incident ray directions are used in conjunction with coupled wave analysis to determine the diffraction efficiency at different locations on the hologram aperture and the direction of the diffracted beam from the localized coordinates. In step 410, the refractive index is modulated to determine its effect on the diffraction efficiency. The combined ray trace and diffraction efficiency (DE) values from each location on the aperture are used in step 412 to determine the image properties. The image result is evaluated in step 414 to decide if the system performance is acceptable. If so, the parameter of the hologram are used in step 416 to expose photosensitive polymers based on those parameters, and the polymer is developed to obtain the hologram.

The terms and expressions which have been employed in the foregoing specification are used therein as terms of description and not of limitation, and there is no intention, in the use of such terms and expressions, to exclude equivalents of the features shown and described or portions thereof, it being recognized that the scope of the invention is defined and limited only by the claims that follow.

The invention claimed is:

1. A holographic imaging system, comprising:
   a volume hologram having a front and a back and a plurality of multiplexed diffraction gratings formed therein each configured to provide high angular and spectral wavefront selectivity;
   an objective lens having a front and a back and being disposed in front of the hologram so as to perform an optical transformation between a point on a surface in front of the objective lens corresponding to said diffraction grating and a beam propagating between the back of the objective lens and the front of the hologram;

a collection lens having a front and a back and being disposed in back of the hologram so as to perform an optical transformation from beam propagating from the back of the hologram to the front of the collection lens and to a point in back of the collection lens; and a multi-spectral illuminator disposed with respect to the hologram so as to provide an illumination beam of light coupled to the back of the hologram to produce multiple diffracted beams of light at the front of the hologram corresponding to wavelengths of light in the illumination beam which are focused by the objective lens to respective different positions on the surface in front of the objective lens corresponding to said diffraction grating, wherein the volume hologram is configured in the system to function as both the illumination hologram and the imaging hologram to provide for dispersion matching thereof and simultaneously provide mapping, based on satisfaction of Bragg phase-matching, of points from multiple depths in an object space to distinct, corresponding locations on an image plane.

2. The system of claim 1, further comprising a beam splitter disposed between the back of the hologram and the illuminator so as to direct light from the illuminator toward the back of the hologram and to direct light from the back of the hologram to the collection lens.

3. The system of claim 2, wherein the illuminator comprises a multi-spectral light source and an illuminator lens for transforming light from the light source to the illumination beam of light coupled to the back of the hologram.

4. The system of claim 3, wherein the illuminator further comprises a mask having at least one rectangular aperture disposed between the multi-spectral light source and the illuminator lens.

5. The system of claim 4, wherein the hologram has multiple diffraction gratings formed therein and the mask has corresponding multiple apertures formed therein so that light transmitted through each aperture converges to a point on a corresponding distinct plane in front of the objective lens and each image of point in front of the objective lens is formed at a unique location on the back focal plane of the collection lens.

6. The system of claim 5, further comprising an image detector disposed at the back focal plane of the collection lens so as to detect images of points on an object disposed in front of the objective lens.

7. The system of claim 1, wherein the illuminator comprises a multi-spectral light source and an illuminator lens for transforming light from the light source to the illumination beam of light coupled to the back of the hologram.

8. The system of claim 7, wherein the illuminator further comprises a mask having at least one rectangular aperture disposed between the multi-spectral light source and the illuminator lens.

9. The system of claim 8, wherein the hologram has multiple diffraction gratings formed therein and the mask has corresponding multiple apertures formed therein so that light transmitted through each aperture converges to a point on a corresponding distinct plane in front of the objective lens and each image of point in front of the objective lens is formed at a unique location on the back focal plane of the collection lens.

10. The system of claim 1, wherein the hologram has multiple diffraction gratings formed therein and so that light in the illumination beam originating from different lateral positions converges to respective points on a corresponding distinct parallel planes in front of the objective lens.

11. The system of claim 10, further comprising an image detector disposed at the back focal plane of the collection lens so as to detect images of points on an object disposed in front of the objective lens.

12. The system of claim 1, further comprising an image detector disposed at the back focal plane of the collection lens so as to detect images of points on an object disposed in front of the objective lens.

13. A holographic imaging system, comprising:
an objective lens system having a front, a back, a first optical axis, and a pupil disposed in back of the objective lens system;
a collection relay lens system having a front and a back and sharing the first optical axis;
a collection lens having a front and a back;
an imaging volume hologram having a plurality of multiplexed diffraction gratings formed therein each configured to provide high angular and spectral wavefront selectivity, and disposed between the collection lens and the collection relay lens system at a point on the first optical axis conjugate to the location of the pupil of the objective lens system on the first optical axis and at the front focal point of the collection lens;
an illumination relay lens system having a front and a back and a second optical axis intersecting the first optical axis at a nonzero angle;
an illumination lens having a front and a back;
an illumination volume hologram disposed between the illumination lens and the illumination relay lens system at a point on the second optical axis conjugate to the location of the pupil of the objective lens system on the first optical axis and at the back focal point of the illumination lens, the illumination volume hologram having a plurality of multiplexed diffraction gratings formed therein that are configured to be substantially identical to the multiplexed diffraction gratings formed in the imaging hologram; and
a beam splitter disposed at the intersection of the first optical axis and the second optical axis so as to reflect light from the illumination relay lens system toward the objective relay lens system and to pass light from the objective relay lens system to the collection relay lens system so that when a source of multi-spectral light is disposed at the front focal point of the illumination lens and an object is placed in front of the objective lens, points on the object that are illuminated by light from the multi-spectral source will be imaged at the back focal plane of the collection lens, while most light that is diffusely scattered by the illumination hologram and the imaging hologram will be directed away from the back focal plane of the collection lens by the beam splitter, and wherein the illumination and imaging holograms are configured to provide for dispersion matching thereof and simultaneously provide mapping based on satisfaction of Bragg phase-matching, of points from multiple depths in an object space to distinct, corresponding locations on an image plane.

14. The system of claim 13, wherein the objective lens system comprises an objective lens having a front and a back, an objective relay lens system in back of the objective lens, and an aperture stop disposed between the objective lens and the objective relay lens system so as to establish the pupil of the objective lens system.

15. The system of claim 13, further comprising a multi-spectral light source disposed at the front focal point of the illumination lens and a mask having at least one rectangular aperture disposed between the multi-spectral light source and the illumination lens.

16. The system of claim 15, wherein the first and second holograms have multiple diffraction gratings formed therein and the mask has corresponding multiple apertures formed therein so that light transmitted through each aperture converges to a point on a corresponding distinct plane in front of the objective lens and each image of point in front of the objective lens is formed at a unique location on the back focal plane of the collection lens.

17. The system of claim 13, wherein the hologram has multiple diffraction gratings formed therein so that illumination light originating from different lateral positions converges to respective points on corresponding distinct parallel planes in front of the objective lens system.

18. The system of claim 17, further comprising an image detector disposed at the back focal plane of the collection lens so as to detect images of points on an object disposed in front of the objective lens system.

19. The system of claim 1, further comprising an image detector disposed at the back focal plane of the collection lens so as to detect images of points on an object disposed in front of the objective lens system.

20. A method for making a thick hologram for use in an imaging system, comprising:
   configuring a first order optical system having:
      a thick hologram having a front and a back and a plurality of multiplexed diffraction gratings formed therein each configured to provide high angular and spectral wavefront selectivity;
      an objective lens having a front and a back and being disposed in front of the hologram so as to perform an optical transformation between a point on a surface in front of the objective lens corresponding to said diffraction grating and a beam propagating between the back of the objective lens and the front of the hologram;
      a collection lens having a front and a back and being disposed in back of the hologram so as to perform an optical transformation from beam propagating from the back of the hologram to the front of the collection lens and to a point in back of the collection lens; and
      a multi-spectral light beam source disposed with respect to the hologram so as to provide a source beam of light coupled to the back of the hologram so as to produce multiple diffracted beams of light at the front of the hologram corresponding to wavelengths of light in the source beam which are focused by the objective lens to respective different positions on the surface in front of the objective lens corresponding to said diffraction grating, wherein the hologram is configured in the imaging system to function as both the illumination hologram and the imaging hologram, to provide for dispersion matching thereof and simultaneously provide mapping, based on satisfaction of Bragg phase-matching, of points from multiple depths in an object space to distinct, corresponding locations on an image plane;
   performing a ray trace analysis of the first order optical system to compute the required curvature of the grating vector across the aperture of the hologram;
   determining the diffraction efficiency and the diffracted ray direction at a plurality of locations on the hologram aperture using corresponding localized grating vectors, corresponding ray directions from the ray trace analysis, coupled wave analysis; and
   determining properties of the image created by the optical system based on the ray directions and diffraction efficiencies at the plurality of locations on the hologram aperture.

21. The method of claim 20, further comprising repeating the steps of claim 20 with different hologram refractive index modulations and evaluating the acceptability of the image properties until acceptable image performance is achieved.

* * * * *

UNITED STATES PATENT AND TRADEMARK OFFICE
CERTIFICATE OF CORRECTION

PATENT NO. : 9,715,214 B2
APPLICATION NO. : 13/825744
DATED : July 25, 2017
INVENTOR(S) : Raymond K. Kostuk et al.

Page 1 of 1

It is certified that error appears in the above-identified patent and that said Letters Patent is hereby corrected as shown below:

Column 1, starting at Line 4:

Please add:

This invention was made with government support under Grant No. R01 CA134424 awarded by the National Institutes of Health. The government has certain rights in the invention.

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*